United States Patent
Gurvich et al.

(10) Patent No.: US 12,400,433 B2
(45) Date of Patent: Aug. 26, 2025

(54) SYSTEM AND METHOD FOR AUTOMATED CONSTRUCTION OF DATA SETS FOR RETRAINING A MACHINE LEARNING MODEL

(71) Applicant: Shopify Inc., Ottawa (CA)

(72) Inventors: Roni Gurvich, Ramat Gan (IL); Peng Yu, Montreal (CA)

(73) Assignee: SHOPIFY INC., Ottawa (CA)

( * ) Notice: Subject to any disclaimer, the term of this patent is extended or adjusted under 35 U.S.C. 154(b) by 435 days.

(21) Appl. No.: 18/049,874

(22) Filed: Oct. 26, 2022

(65) Prior Publication Data
US 2024/0144654 A1     May 2, 2024

(51) Int. Cl.
*G06V 10/776* (2022.01)
*G06V 10/774* (2022.01)

(52) U.S. Cl.
CPC .......... *G06V 10/774* (2022.01); *G06V 10/776* (2022.01)

(58) Field of Classification Search
CPC ............................. G06V 10/774; G06V 10/776
See application file for complete search history.

(56) References Cited

U.S. PATENT DOCUMENTS

| | | | |
|---|---|---|---|
| 2012/0284212 A1* | 11/2012 | Lin | G06N 20/00 706/12 |
| 2019/0378010 A1* | 12/2019 | Morris | G06F 16/288 |
| 2021/0224687 A1* | 7/2021 | Goldszmidt | G06F 18/2415 |
| 2023/0325630 A1* | 10/2023 | Wu | G06N 3/044 706/25 |

OTHER PUBLICATIONS

Li et al, Maximal independent sets in bipartite graphs with at least one cycle, 2013, Discrete Mathematics and Theoretical Computer Science, 15:2, 243-258. (Year: 2013).*
Jambor et al, On a scalable problem transformation method for multi-label learning, 2019, arXiv: 1905.11518v1, pp. 1-3. (Year: 2019).*
Hashemi et al, A bipartite matching-based feature selection for multi-label learning, 2020, Int. J. Machine Learning and Cybernetics, (2021)12: 459-475. (Year: 2020).*
Wu et al, Learning of Multimodal Representations with Random Walks on the Click Graph, 2015, IEEE Transactions on Image Processing, (25)2: 630-642. (Year: 2015).*

(Continued)

*Primary Examiner* — Kathleen M Broughton

(57) ABSTRACT

A computer-implemented method and system for optimally retraining a supervised machine learning model based on newly received data. The method comprises receiving, from a requestor device, a new data set for updating a previously-trained model generated using a first training data set and tested using a first testing data set. Then, the new data set is checked for components having an association to both the first training data set and the first testing data set; and where such components are found, they are deleted. Once all of the components of the new data have been examined, remaining components of the new data set are assigned to one of the first training or testing data set in dependence upon a relationship connectivity therewith to form at least one of an updated testing and training data set for building the updated model.

25 Claims, 13 Drawing Sheets

(56) References Cited

OTHER PUBLICATIONS

Ali Ibrahim Site, "Maximum Independent Set in Bipartite Graphs," https://ali-ibrahim137.github.io/competitive/programming/2020/01/02/maximum-independent-set-in-bipartite-graphs.html (accessed Oct. 26, 2022), Jan. 2, 2020, 9 pages.

Author Unknown, "Maximal independent set," Wikipedia, Available online at: «https://en.wikipedia.org/wiki/Maximal_independent_set», Page last edited: Jul. 10, 2022, 12 pages.

Weisstein, Eric W., "Bipartite Graph," MathWorld—A Wolfram Web Resource, Oct. 11, 2022, Accessed Oct. 28, 2022 from the Internet: URL: <https://mathworld.wolfram.com/BipartiteGraph.html>, 4 pages.

* cited by examiner

SYSTEM AND METHOD FOR AUTOMATED CONSTRUCTION OF DATA SETS FOR RETRAINING A MACHINE LEARNING MODEL

FIELD

The present application relates to machine learning, and, more particularly, to automated construction of training and testing data sets for updating and retraining a previously trained supervised learning model.

BACKGROUND

Accurately classifying data into categories by computing systems in real-time is a challenging and complex problem. The classification of data into defined categories can help users quickly understand and filter through large amounts of data. A computerized model configured to automatically classify electronic data may offer certain benefits in terms of automatically discovering patterns and predicting classifications. However, such benefits are only effective if the model is robust and accurately performs the classifications over time.

SUMMARY

Supervised learning models may be used for a variety of purposes. In some circumstances, it may be necessary to update such models.

For example, a classification model used to categorize products into categories may become obsolete over time as the input product data that the classification model categorizes is constantly changing and evolving. For example, a computerized classification model previously trained and tested on old product data, having no knowledge of the new unseen product information, may thus be unable to accurately identify and categorize the new products.

When developing a machine-learning model, using outdated data to train the model renders the model ineffective and unusable. Similarly, using outdated data to test the model also may provide false hope relating to the accuracy of the model. In an e-commerce example whereby the underlying data to be classified is evolving quickly, the data that the model encounters in deployment may significantly change from the data that was used to train and/or test the model in production for a variety of reasons, such as the passage of time or the changing needs of the classification model. This is an example of a data drift occurring whereby a model needs to be retrained to account for the data drift. Generally, a data drift is a model drift that includes changes in the data due to seasonality, changes in consumer preferences, the addition of new products, the modification of existing products, etc.

For example, a computerized classification model may be trained to classify an online image of a particular product item as a "shoe" or "sneaker" based on a previous training data set. However, over time, online buyers may use new words to describe shoes i.e. "kicks'. If the classification model is not re-trained with the new data reflecting the updated needs of what the model may need to classify, the model may lose the ability to make accurate and relevant predictions and decay in its performance.

Thus, to account for data drift and improve the model performance, it is necessary to continually retrain and retest the model. However, simply randomly assigning newly received or detected product data to training data or testing data may lead to data leakage and thereby reduce effectiveness of the model.

In addition, other approaches to assigning the data to training or testing data may be computationally intensive and require significant manual analysis, which prevents such approaches from effectively operating in live and real-time environments.

Computational approaches are described herein in various embodiments whereby computer systems and methods are configured to automatically and intelligently construct a training and testing data set for use in updating a previously trained supervised learning model such as a classification model for classifying products into categories based on newly received product data, such to account for data drift in the model. Conveniently, in at least some aspects, the system and method constructs the training and testing data sets such as to avoid data leaks while optimizing the amount of newly received data components (e.g. product data) used for updating the model in order to improve the computational performance and accuracy of the model for understanding the new data.

In at least some implementations, there is provided a system and method of optimally determining which new data points (e.g. detected new data products) to include in an updated training set when expanding the training dataset of a previously trained classification model to retrain the model based on the new incoming data points.

In at least some implementations, one aim of the system and method presented herein is to maintain a consistent testing set, and to include new data (e.g. product data) into the training set without causing data leaks. In some aspects, such data leaks may occur if there is data overlap between the testing and training set, e.g. the same electronic image or text is present in both a training and testing data set. In such a case, there is a risk that the model may simply memorize this information and thus may compromise the effectiveness of the model.

In at least some implementations, there is provided a computer-implemented method comprising: receiving a new data set from a requestor device for updating a previously-trained classification model generated using a first training data set and tested using a first testing data set; determining that the new data set includes or has one or more components having an association, directly or indirectly via another component, to both the first training data set and the first testing data set; responsive to determining that the new data set has one or more components having an association to both the first training data set and the first testing data set, deleting the one or more components; and, assigning remaining components of the new data set to one of the first training data set or the first testing data set in dependence upon a relationship connectivity determined therewith to form at least one of an updated testing data set and an updated training data set for building an updated classification model.

In at least some aspects, the method further comprises applying the updated testing data set having at least some components of the new data set for evaluating both the updated classification model and the previously-trained classification model to determine a performance comparison therebetween.

In at least some aspects, subsequent to applying the updated testing data set to determine the performance comparison, deploying one of: the previously trained classification model and the updated classification model corresponding to an improved performance for classification of subsequent data sets.

In at least some aspects, components previously partitioned in the first training data set and the first testing data set remain in persistent original partitions for performing testing or training when the at least one of the updated testing data set and the updated training data set is formed.

In at least some aspects, each component of the new data set, the first training data set, the first testing data set, the at least one of the updated training data set and the updated testing data set comprises data corresponding to one of: a product identification, a product image and a product textual data.

In at least some aspects, the method further comprises: generating a bipartite graph having a plurality of vertices corresponding to respective components of the first training data set and the first testing data set, the bipartite graph comprising a first portion having at least one vertex corresponding to product image data, a second portion having at least one vertex corresponding to product textual data, and graph edges connecting vertices of the first portion to vertices of the second portion to indicate sharing data therebetween; adding vertices corresponding to components of the new data set to the bipartite graph; and determining that a particular component vertex of the added vertices of the bipartite graph is connected by one or more graph edges to both a vertex of the first testing data set and to a vertex of the first training data set; wherein deleting the one or more components comprises: removing the particular component vertex from the bipartite graph.

In at least some aspects, the method further comprises: generating a bipartite graph having a plurality of vertices corresponding to respective components of the first training data set and the first testing data set, the bipartite graph comprising a first portion having at least one vertex corresponding to a product image, a second portion having at least one vertex corresponding to a product textual data, and graph edges connecting vertices of the first portion to the second portion; adding vertices corresponding to components of the new data set to the bipartite graph; and applying a maximum independent set algorithm to the bipartite graph, the bipartite graph further comprising the added vertices corresponding to components of the new data set, for determining a largest independent data set to form the at least one of the updated training data set and the updated testing data set, wherein deleting the one or more components comprises: removing vertices from the bipartite graph not associated with the determined largest independent data set.

In at least some aspects, deleting the one or more components further comprises: deleting vertices connected by one or more graph edges to vertices not associated with the determined largest independent data set.

In at least some aspects, the method further comprises: receiving a trigger from the requestor device providing an indication of updating the previously-trained classification model, the trigger comprising one or more of: a defined time interval from generating the previously-trained classification model; an indication from the requestor device that the previously-trained classification model is degrading in performance for classifying incoming data sets; or a notification that incoming datasets for classification by the classification model have different classifications than the first training data set; and, in response to the trigger, querying the requestor device for the new data set for retraining the previously-trained classification model.

In at least some aspects, the method further comprises: transmitting the updated classification model to the requestor device, across a communications network for automatically applying to subsequent data sets for classification.

In at least some aspects, the method is performed by two or more computers cooperating together across the communications network.

In at least one aspect, there is provided a computer system comprising: a processor; and a storage storing instructions that, when executed by the processor cause the system to: receive a new data set from a requestor device for updating a previously-trained classification model generated using a first training data set and tested using a first testing data set; determine whether the new data set includes or has one or more components having an association, directly or indirectly via another component, to both the first training data set and the first testing data set; responsive to such determination, delete the one or more components; and, assign remaining components of the new data set to one of the first training data set or the first testing data set in dependence upon a relationship connectivity determined therewith to form at least one of an updated testing data set and an updated training data set for building an updated classification model.

There is also provided a computer program product comprising a non-transient storage device storing instructions that when executed by at least one processor of a computing device, configure the computing device to perform operations in accordance with the methods discussed herein.

In at least one aspect, there is provided a computer-implemented method comprising: receiving a new data set from a requestor device for updating a previously-trained machine learning model generated using supervised learning with a first training data set and tested using a first testing data set; determining that the new data set has one or more components having an association, directly or indirectly via another component, to both the first training data set and the first testing data set; responsive to determining that the new data set has one or more components having an association to both the first training data set and the first testing data set, deleting the one or more components; and assigning remaining components of the new data set to one of the first training data set or the first testing data set in dependence upon a relationship connectivity determined therewith to form at least one of an updated testing data set and an updated training data set for building an updated machine learning model.

In at least one aspect, there is provided a computer system comprising: a processor; and a storage storing instructions that, when executed by the processor, cause the system to: receive a new data set from a requestor device for updating a previously-trained machine learning model generated using supervised learning with a first training data set and tested using a first testing data set; determine that the new data set has one or more components having an association, directly or indirectly via another component, to both the first training data set and the first testing data set; responsive to determining that the new data set has one or more components having an association to both the first training data set and the first testing data set, delete the one or more components; and, assign remaining components of the new data set to one of the first training data set or the first testing data set in dependence upon a relationship connectivity determined therewith to form at least one of an updated testing data set and an updated training data set for building an updated machine learning model.

These and other aspects will be apparent to those of ordinary skill in the art.

BRIEF DESCRIPTION OF THE DRAWINGS

Embodiments will be described, by way of example only, with reference to the accompanying figures wherein.

DETAILED DESCRIPTION

Figure 1:
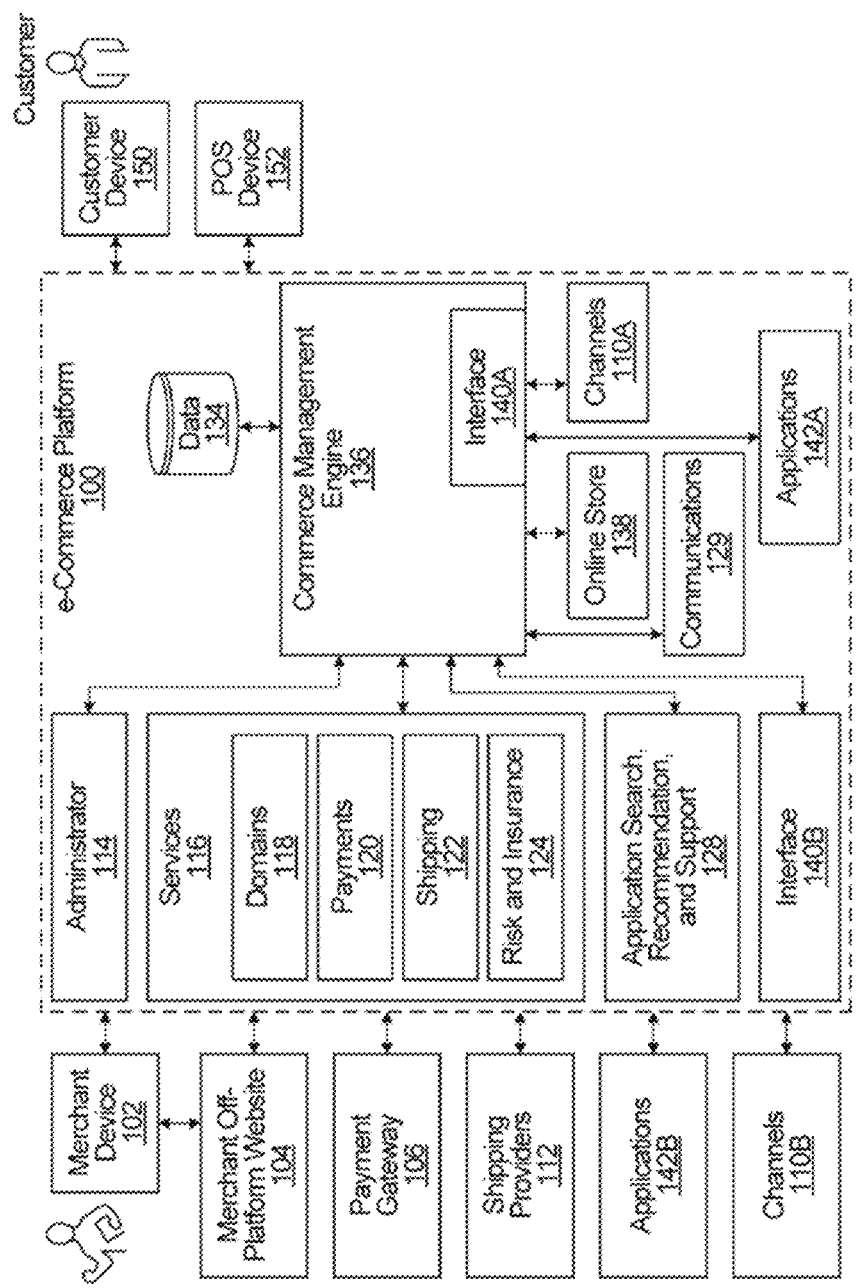
FIG. 1. is a block diagram of an e-commerce platform in accordance with one embodiment.

One or more currently preferred embodiments have been described by way of example. It will be apparent to persons skilled in the art that a number of variations and modifications can be made without departing from the scope of the disclosure as defined in the claims.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The present application relates, in at least some embodiments to a system and method of constructing a training and testing data set for retraining a previously trained classification model to classify products into categories based on an indication of a data drift, such as newly received product data, without causing data leaks between the training and testing data sets. In at least some embodiments, the systems and methods are further configured to optimize and maximize the amount of newly received product data used for updating the model while avoiding the data leaks.

Generally, there is provided a system and method of optimally determining which detected new data points to include in an updated training set when expanding the training dataset of a previously trained classification model to retrain the model based on the new incoming data points. The new data points may include a set of data components including product identification data, image data and text data defining e-commerce products. In one aspect, the system and method may be configured to monitor and track model data for differences between the baseline (e.g. training) and serving (e.g. target) data sets and upon determining that a sufficient difference exists between the baseline and target or deployment data sets, trigger an indication of data drift. Such indication may initiate the model update and implement the model re-training process as described herein.

One goal of the system and method, in at least some aspects, is to maintain persistent partitioning of the testing set and the training set (e.g. as compared to the prior model) and include new data (e.g. product data) into the training set or testing set without causing data leaks. Such data leaks may occur if the same image or text is present in both a training and testing data set in which case, there is a risk that the model may simply memorize this information and thus may compromise the effectiveness of the model. Put another way, when retraining, the system and method removes from inclusion in the new model data sets, new data components which are linked (either directly or indirectly such as by way of having common underlying data) to at least some data in each of the training and the testing data sets. Instead, in at least one aspect, the systems and methods proposed herein include new data for insertion into the updated training/ testing data sets which would not cause a data leak.

An Example e-Commerce Platform

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript™, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
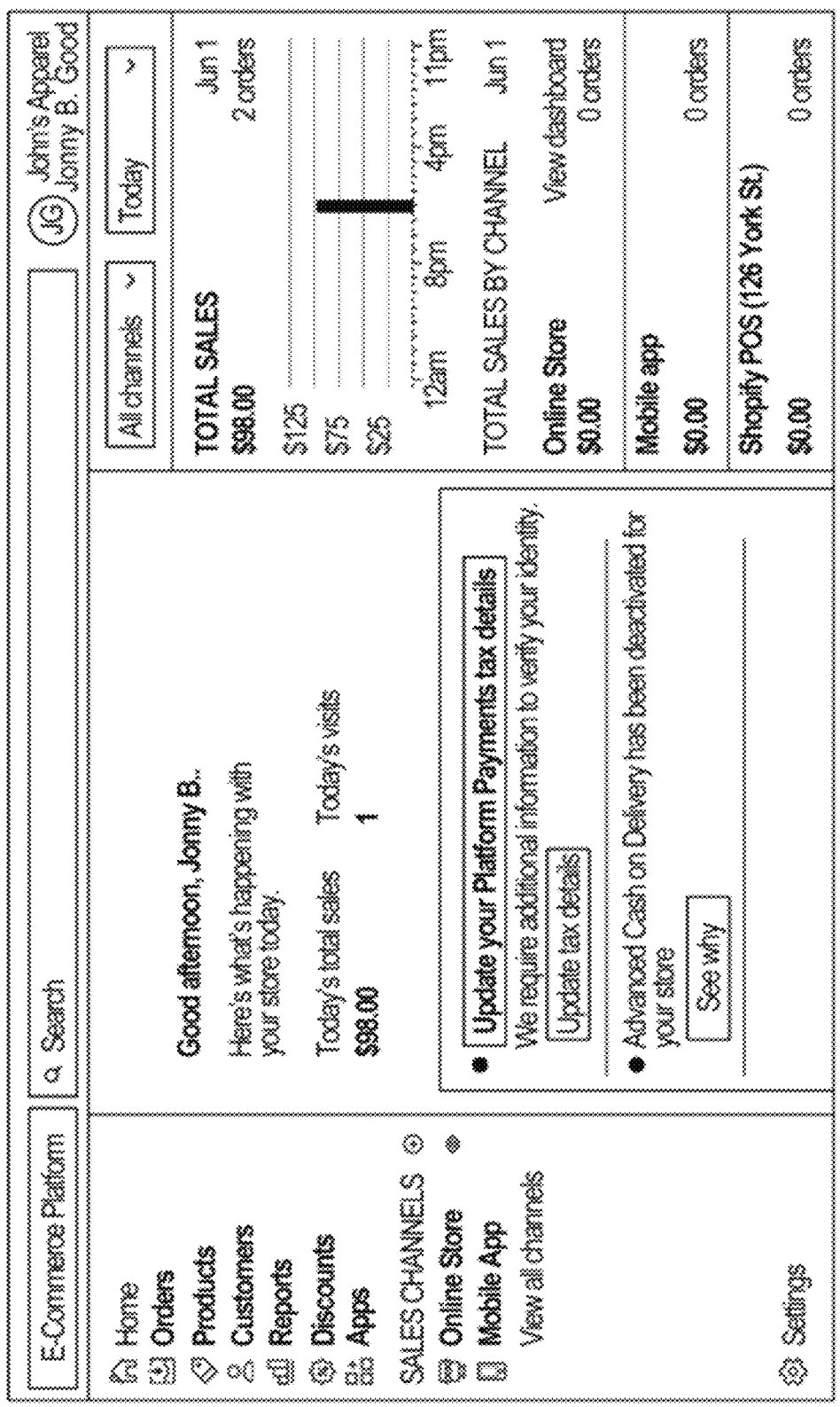
FIG. 2 is an example of a home page of an administrator, according to one embodiment.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Engine 300—Automated Classification System

Figure 3:
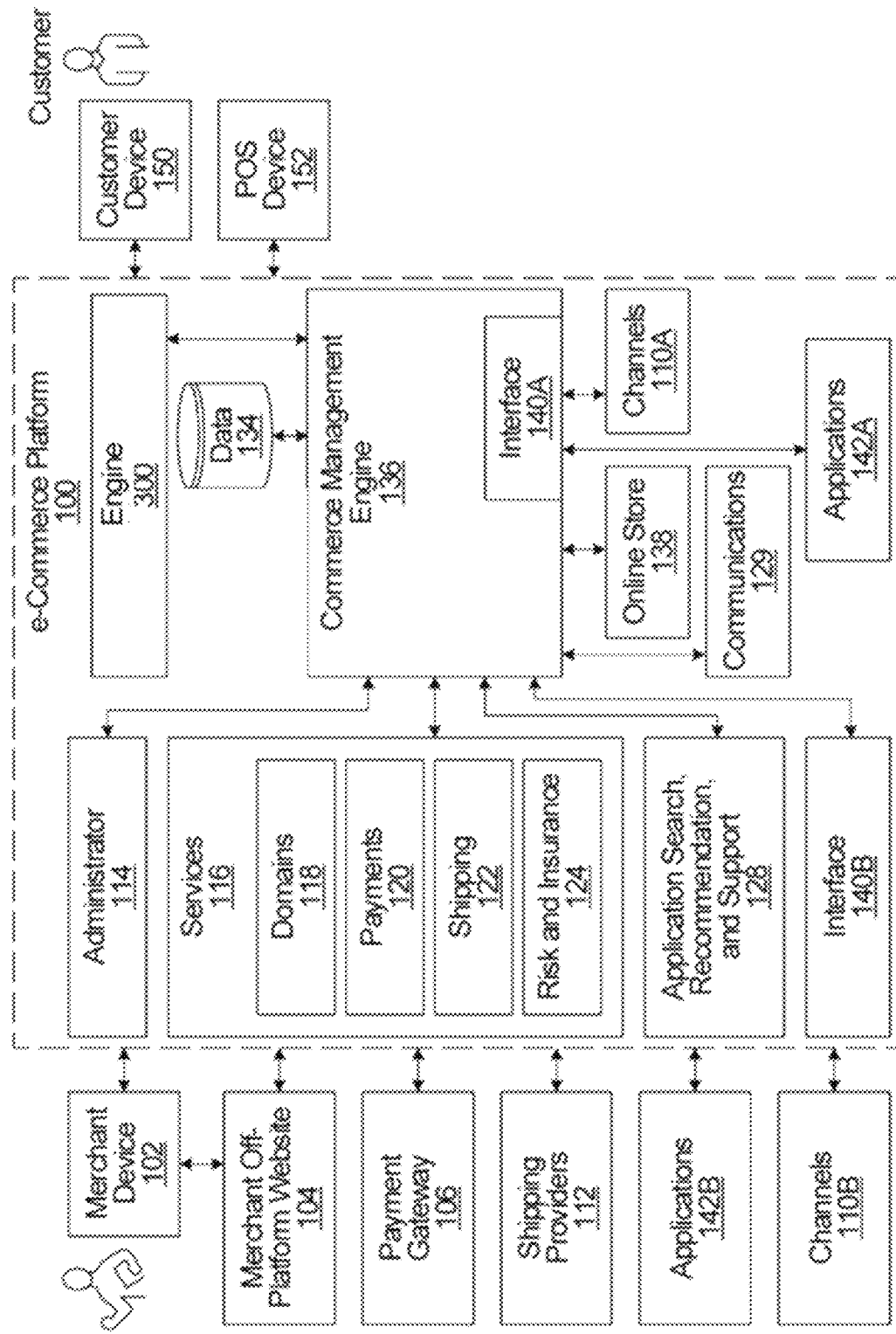
FIG. 3 illustrates the e-commerce platform of FIG. 1 but includes an engine for intelligently and continually retraining a previously trained machine learning model for product classification based on newly received data, according to one embodiment.

The functionality described herein may be used in e-commerce systems to provide improved online customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented classification system and engine that implements the functionality described herein for use by the e-commerce platform 100, the customer device 150 and/or the merchant device 102.

Although the engine 300 is illustrated as a distinct component of the e-commerce platform 100 in FIG. 3, this is only an example. The engine 300 may also be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides the aforementioned engine. However, the location of the engine 300 is implementation specific. In some implementations, the engine 300 is provided at least in part by an e-commerce platform (e.g. e-commerce platform 100), either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms and may be implemented in other computing devices.

Figure 4:
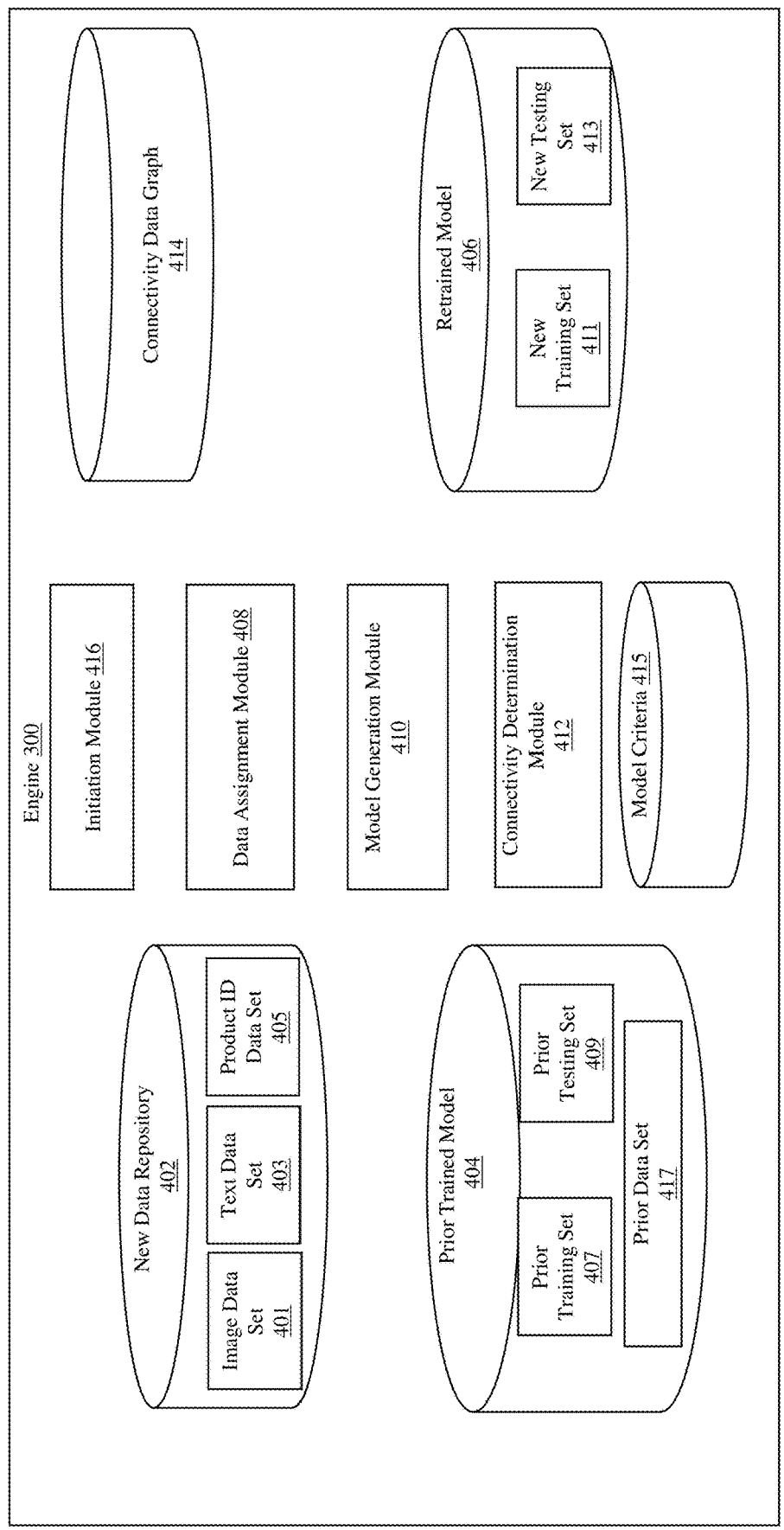
FIG. 4 is a further detailed example of the computing components and modules of the engine of FIG. 3, according to one embodiment.

Referring to FIG. 4, shown is an example engine 300 according to one embodiment, which includes various computing modules and electronic data stores. Generally, the engine 300 is configured for optimally including new data to continually retrain a previously trained supervised learning model such as a machine learning classification model. The engine 300 is further configured to optimize the amount of new data samples added to the training set to improve model performance, while ensuring a consistent test set and avoiding data leakage between the training and testing data sets.

Although the embodiments and aspects disclosed herein may refer to retraining and updating a classification model, the disclosed systems, methods and computing device(s) may apply similarly and more broadly to other supervised machine learning models, including object detection models. Generally, such supervised machine learning models may refer to any machine learning model that requires ground truth data to learn from. In such models, the ground truth may be used as the target variable for training and validating the model with a known labeled dataset.

Previously, a method and system for splitting data into testing and training data sets was described in U.S. patent application Ser. No. 17/554,474, filed Dec. 17, 2021 and entitled "SYSTEMS AND METHODS FOR AUTOMATED PRODUCT CLASSIFICATION", the entire contents of which are incorporated herein by reference (hereinafter '474 patent). Generally, the '474 patent addressed issues that occur with naive methods of segmenting data into training and testing sets; overfitting and lack of generalizability which can occur when randomly assigning product data (e.g. product ID, images, text) into test and train sets since in some cases multiple products share images and text. In such cases, randomly assigning product data to training and testing data sets could risk a data leak (overlap of information between the training and testing data sets). One proposed solution was to split data into training and testing data sets based on graph mining theory. A component node in the graph could be a product ID, image hash or text hash. Independent connected sets of product ID, image hashes and text hashes, referred to as components, were split into either test or train datasets. In such a system, connected components were split into test or train data sets so there was no way that data leakage may occur.

However, although the '474 patent avoids data leakage by preventing the same samples being in the training and testing data sets, there may continually be new products and associated product information being received at the classification model which needs to be accounted for (e.g. a model data drift). In addition, such new products may share images or text with existing products, which are already partitioned into training and testing data sets.

Referring now to FIGS. 1-4, in at least some embodiments, one technical problem addressed by the engine 300 is accounting for data drift such as to retrain and rebuild a supervised machine learning model such as a classification model with an updated testing/training set having intelligently selected additions from the new data set. As discussed earlier, such retraining and rebuilding may similarly be applied to other supervised machine learning models such as object detection models (which may also include classification and localization processes). Conveniently, by continually and dynamically incorporating one or more components from the new data samples, this improves the computational performance of the model while automatically removing from inclusion in the new model, new data components which would cause a data leak.

As the model performance of the trained model (new or past) may be based on certain performance metrics (e.g. ability to accurately classify data), if the test set is updated constantly in different build runs of the model, then it will not be clear as to which run of the model is better than another. In one case, a consistent test set may refer to a data set that has sufficient overlapping data with a prior test set so that the revised model may be compared to the prior model to detect performance. In at least some aspects, the test set is required to not have elements in common with the current or prior test set, thereby keeping persistent partitions. In some examples, a new test set comprising newly received data assigned as described herein (but not overlapping with the training sets) may be applied to both the current and prior models for evaluating performance.

Thus, in order to assess the performance of the newly trained model against the performance of the previous model, it is necessary to maintain a consistent (or mostly consistent) test set. Any variance in the testing set may confuse the evaluation of the new and old model as it becomes unclear as to whether the discrepancy in the model accuracy is due to the variance in the composition of the test data set or to the changed model.

In at least some examples, consistent training and testing sets means that data previously assigned to testing or training sets must remain in their original partition of labeled data sets and new data may only be added to the training or testing data set if it does not cause data leakage.

The problem in expanding the training set is that new data may contain chains of connected products (e.g. component nodes or vertices containing metadata relating to product ID, product image, and/or product text) that share an association with other product data (e.g. other product component nodes having product ID, product image, and/or product text) in either the training or testing set of the previous model and thereby cause data leakage.

Conveniently, in at least some implementations, the methods and systems described herein may be advantageous as they avoid data leakage while improving the computing model's performance for supervised learning such as classification of product data by accounting for new data samples detected by re-building and re-training an updated supervised learning model such as a classification model via intelligently adding the newly observed data points to the training and testing data sets of the new model.

Referring to the engine 300 illustrated in FIGS. 3 and 4, the computing modules and data stores of the engine 300 may comprise: an initiation module 416 for optionally detecting when new incoming data indicates a need to retrain a prior trained model, a data assignment module 408 for optimally assigning new data samples to a training or testing data set of a prior trained model, a model generation module 410 for generating a new model based on the assigned data to update the model therefrom, and a connectivity determination module 412 for determining association between components of the new data samples for cooperating with the data assignment module 408 to remove data samples causing data leaks (e.g. overlap between proposed testing set and prior or current training set).

The data stores may include a new data repository 402, a prior trained model 404 data store, a retrained model 406 data store, and a connectivity data graph 414 data store. The new data repository 402 comprises new product data samples or data components including: an image data set 401, a text data set 403, a product ID data set 405 reflecting new information received by the engine 300. In at least some embodiments, the new data repository 402 may include data components received from a requestor device, e.g. a merchant device, requesting from the engine 300 to determine whether the prior trained model 404 is valid and accurate or should be retrained to generate a new model based on the new data seen in real life for classification. The requestor device (not shown) may communicate with the engine 300 across one or more communications networks to perform the operations described herein.

The repository for the prior trained model 404 comprises a prior training set 407, and prior testing set 409. The repository for the retrained model 406 comprises new training set 411 and new testing set 413. Each of the prior training set 407, the prior testing set 409, new training set 411, and new testing set 413 may include data components including one or more product identifiers (ID) and their associated features, including a text hash or an image hash within each respective data set.

Each of the computing components of the engine 300 including the data assignment module 408, the model generation module 410 and the connectivity determination module 412 may be implemented in hardware and/or software and may include instructions, logic rules, machine learning, artificial intelligence or combinations thereof stored on a memory (e.g. stored within data 134 on the e-commerce platform 100 or an external memory accessible by the engine 300) and executed by one or more processors which, as noted above, may be part of or external to the e-commerce platform 100 to provide the functionality described herein.

The engine 300 may include additional computing modules or data stores in various embodiments to provide the implementations described herein. Additional computing modules and data stores may not have been shown in FIG. 4 to avoid undue complexity of the description. For example, one or more user computing devices may detect and/or provide (e.g. via a pull or push mechanism), one or more prior trained models 404 (prior training set 407, prior testing set 409), portions of the new data source data in the new data repository 402 such as the product ID data set 405, the text data set 403, the image data set 401. For simplicity of illustration, the network through which such devices (and corresponding data servers and/or computing models) may communicate with the engine 300 is not shown in FIG. 4.

Thus, at a high level, the engine 300 is configured to dynamically and intelligently construct new training and testing data sets for building a new supervised learning model such as a classification model as new product data samples are detected. In turn, this is used to generate the new classifier based on a previously trained classifier for such use in product classification (e.g. image, text, or other data formats) for e-commerce applications including automated classification of online products into predetermined categories. As noted earlier, such a need to update the previously trained model may arise from model data drift being detected and determining that the product data which the model is classifying at a current time (e.g. deployment time) differs significantly from the model data used to train and test the model in production. However, in at least some aspects, the engine 300 has certain constraints to achieve an optimal model. Such constraints may include that the testing data set is consistent (e.g. no overlap between the testing set and the current or prior training data sets) and that there is no data leakage between the testing and training data sets. Such constraints may be stored in model criteria 415 database shown in FIG. 4.

In at least some implementations, the supervised machine learning model such as the classification model (e.g. prior trained model 404 and/or retrained model 406) generated during the past, current and future runs of the engine 300 may include a supervised machine learning model for classification including but not limited to: a linear classifier, support vector machine (SVM), neural network, decision trees, k-nearest neighbor, and random forest, and others as may be envisaged by a person or persons skilled in the art. It may also be envisaged by persons skilled in the art that the engine 300 may generate other supervised machine learning models such as object detection models.

Generally, the engine 300 may further comprise an initiation module 416 configured to automatically detect data drift (e.g. that the data used to train a prior iteration of the supervised learning model no longer tracks the real world data) and upon such positive detection, trigger an action for the engine 300 to retrain a prior instance of the supervised model. In turn, this generates a new real-time model which better mimics the real data to be classified. For example, the initiation module 416 may be configured to detect new incoming data samples and determine whether such new data samples (e.g. as seen in the deployment stage of the model) are sufficiently different from the training samples used in generating prior runs of the model such as the prior trained model 404 (e.g. having prior data set 417 used for the prior testing set 409 and/or prior training set 407 to build the prior model). In one case, if the initiation module 416 observes that new incoming data (as provided in new data repository 402) is deviating greatly from data used to build the prior trained model (e.g. prior data set 417) then it may initiate a retraining of the model. In turn, this would generate the retrained model 406 via the data assignment module 408, the model generation module 410 and/or the connectivity determination module 412.

Thus, at a high level, the initiation module 416 may be configured to determine whether the classification model previously generated by the engine 300 should be retrained and updated based on new observations of data in the data source available (e.g. new data repository 402). After observing a significant variance in more recent data compared to the prior data set 417 used to generate a prior trained model 404, the initiation module 416 may trigger the engine 300 to proceed with retraining the model.

For instance, the initiation module 416 may be configured to periodically compare feature distributions of live data sets as stored in the new data repository 402 to those of the training data (e.g. prior training set 407) and if a significant deviation is detected by the initiation module 416, then the initiation module 416 may triggers module(s) of the engine 300 to automatically schedule and implement model retraining. This may automatically deploy a new model such as the retrained model 406.

In other aspects, the initiation module 416 may trigger regenerating the model based on one or more cues or factors. Such cues or factors may include but not limited to, the prior model's performance metrics having deteriorated below a certain level; the distribution of classification predictions having changed from those observed during training; or the training data and the deployment data diverging such that the training data no longer adequately mimics the real-world data.

Generally, the engine 300 is configured to account for data drift by expanding the training data set in the prior training set 407 from a prior trained model 404, to a new expanded training set 411 to generate a retrained model 406 to account for new data observed from a data source during production such as stored in new data repository 402 (e.g. any combinations of product ID data set 405 and associated image data set 401 and/or text data set 403). The engine 300 is further configured to expand the training data set to the new training set and/or expand the testing data set to the new testing set 413 based on the new observed data in the new data repository by adhering to a set of criteria, which may be stored in model criteria 415.

In at least some aspects, the model criteria 415 for generating the retrained model 406 by the engine 300 may include but not limited to: ensuring that no data leakage or connectivity of information between a newly generated test set, e.g. new testing set 413 and a currently proposed training set as well as a former iteration of the training set, e.g. the new training set 411 and the prior training set 407.

In operation, the connectivity determination module 412 determines connectivity or relationship of data components between the prior model and the new data set observed, e.g. between the prior training set 407, the prior testing set 409, and the new data repository 402.

In one aspect, the connectivity determination module 412 may generate a visual representation of relationships between data components in a connectivity data graph 414, which may be displayed on a user interface of the engine 300. Namely, the connectivity data graph 414 may provide a visual representation of the data components in each of the current and former training/testing data sets and the new data set as nodes or vertices on a graph whereby edges or links are depicted on the graph to illustrate a relationship between attributes or values in the components. For example, two data components having similar attributes (e.g. same image, same product text or same product ID) may have an edge connecting the two vertices representing the underlying data components.

In some aspects, the connectivity data graph 414 may be a bipartite graph with vertices representing data samples for the prior model data and the new data. Such a bipartite graph generated by the connectivity data graph 414 is depicted as having one side of the graph representing product identification information (e.g. product ID data set 405 for the new data; and product ID for the prior training set 407 and the prior testing set 409) while the second side of the graph represents feature or attribute information including image and/or text data associated with the product (e.g. image data set 401, text data set 403). Examples of such bipartite graphs are provided in FIGS. 7A-7D.

Thus, once the connectivity determination module 412 determines the relationships and associations between the attributes in the data components for the prior model and the newly received data, the data assignment module 408 may cooperate with the connectivity determination module 412 to remove any new data components from inclusion in the model data for generating the retrained model 406, which link the testing and training data set. That is, any new data components which may cause a link (shown as one or more edges joining vertices) between data components in the prior training set 407 and the prior testing set 409 are not included in the new model's training/test data thereby avoiding a data leakage. As noted earlier, such data leakage would cause the predictive scores of accuracy to overestimate the model's utility when run in a production stage.

In the current aspect, the data assignment module 408 and/or the connectivity determination module 412 may implement a one hop traversal algorithm (e.g. as applied to the connectivity data graph 414) which reviews each proposed new data component in the new data repository 402 and for any data components which create a conflict in that they link the testing and training data sets, then such data components are deleted or removed from consideration for generating the retrained model 406. The remaining data components in the new data repository 402 which have not been removed as per the information leakage criteria may then be assigned by the data assignment module 408 to either the new training set 411 or the new testing set 413. In one aspect, such assignment is performed based on determining whether a link already exists to one of the partitions of data (e.g. if a new data component is linked to one or more components in the prior training set 407 then the new data component is added thereto to generate the new training set 411).

In an alternative aspect, the data assignment module 408 and/or the connectivity determination module 412 may first implement a maximum independent set algorithm on the bipartite graph generated by the connectivity data graph 414 to determine which of the new data elements to incorporate from the new data repository 402 into the two data partitions of the new training set 411 and/or the new testing set 413. Put simply, the maximum independent set is generated for each of the two partitions, such that no further node or vertex corresponding to a data component (e.g. product ID, text data, image data) may be added to the prior training set 407 or the prior testing set 409 without violating the independence condition. In this case, the data assignment module 408 may be configured to initially find the largest independent set for each of the training/testing partitions, wherein the independent set comprises a set of vertices such that no two vertices are adjacent in the connectivity data graph 414. Once such maximal independent data sets are determined for each of the testing/training data sets, the new data is thus combined or merged with the prior training set 407/testing set 409 data to generate respectively the new training set 411 and the new testing set 413 while avoiding data leakage. Put simply, a maximal independent set or maximal stable set is an independent set that is not a subset of any other independent set. In other words, there is no vertex outside the independent set that may join it because it is maximal with respect to the independent set property.

In some aspects, the engine 300 may determine which one of the data components from a new data set observed by the engine 300 to include in training/testing sets for retraining a previously trained model by determining the maximum independent set using a bipartite graph, having product vertices in one partition and product feature/image/text in a second partition.

Referring to FIGS. 7A-7D shown are example bipartite graphs generated by the engine 300 (e.g. via the connectivity determination module 412). These graphs may be applied by the engine 300 for determining maximal independent data sets from the prior training data, the prior testing data and the newly observed data which may be applied and assigned to updating the training/testing data sets, via the data assignment module 408, for continually retraining the machine learning model (e.g. to generate a retrained model 406).

Figure 7A:
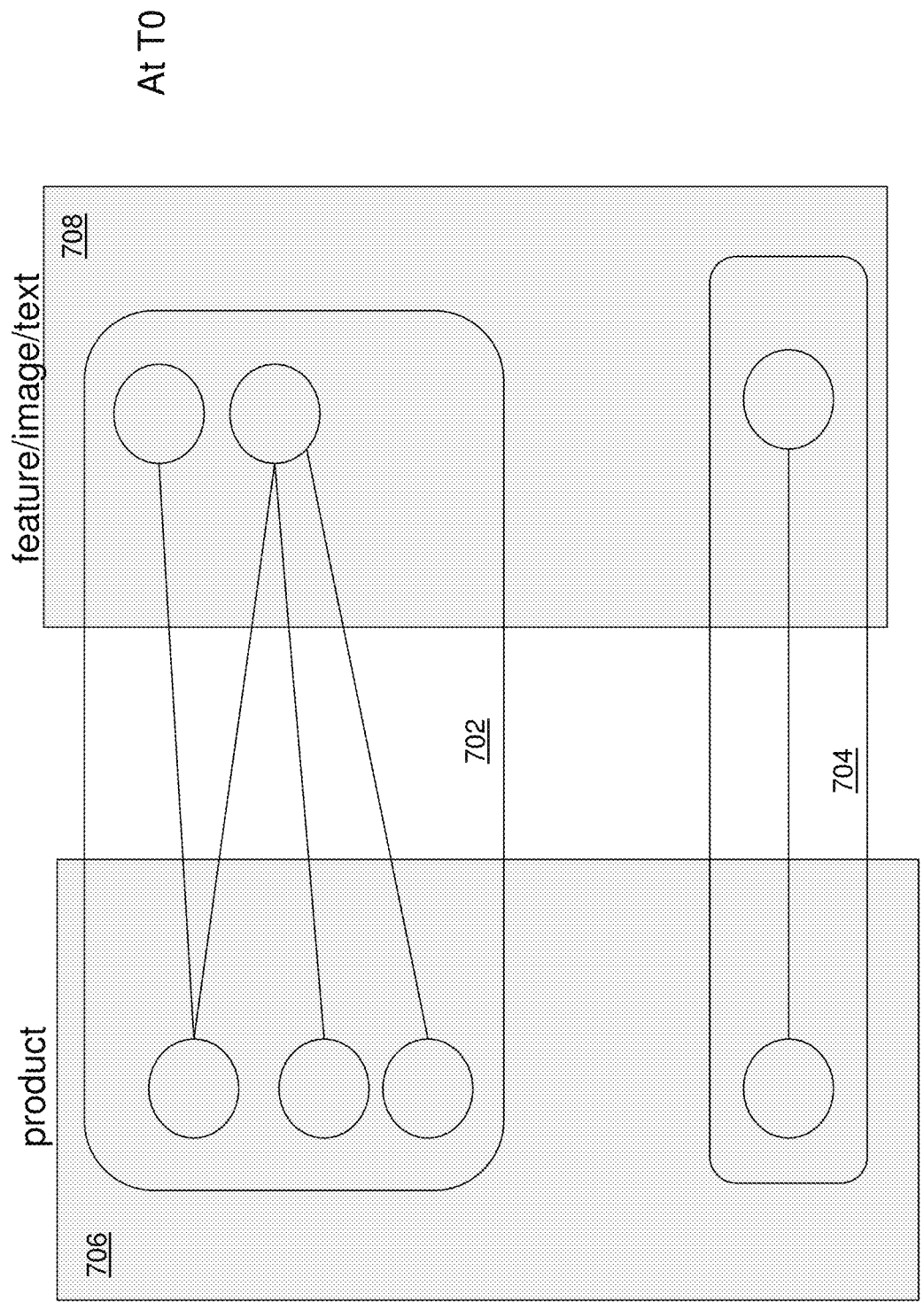
FIGS. 7A-7D are schematic diagrams illustrating an example process performed by the engine of FIGS. 3 and 4 utilizing a maximum independent set algorithm to determine the optimal inclusion of new data components for retraining the machine learning model, according to one embodiment.
Figure 7B:
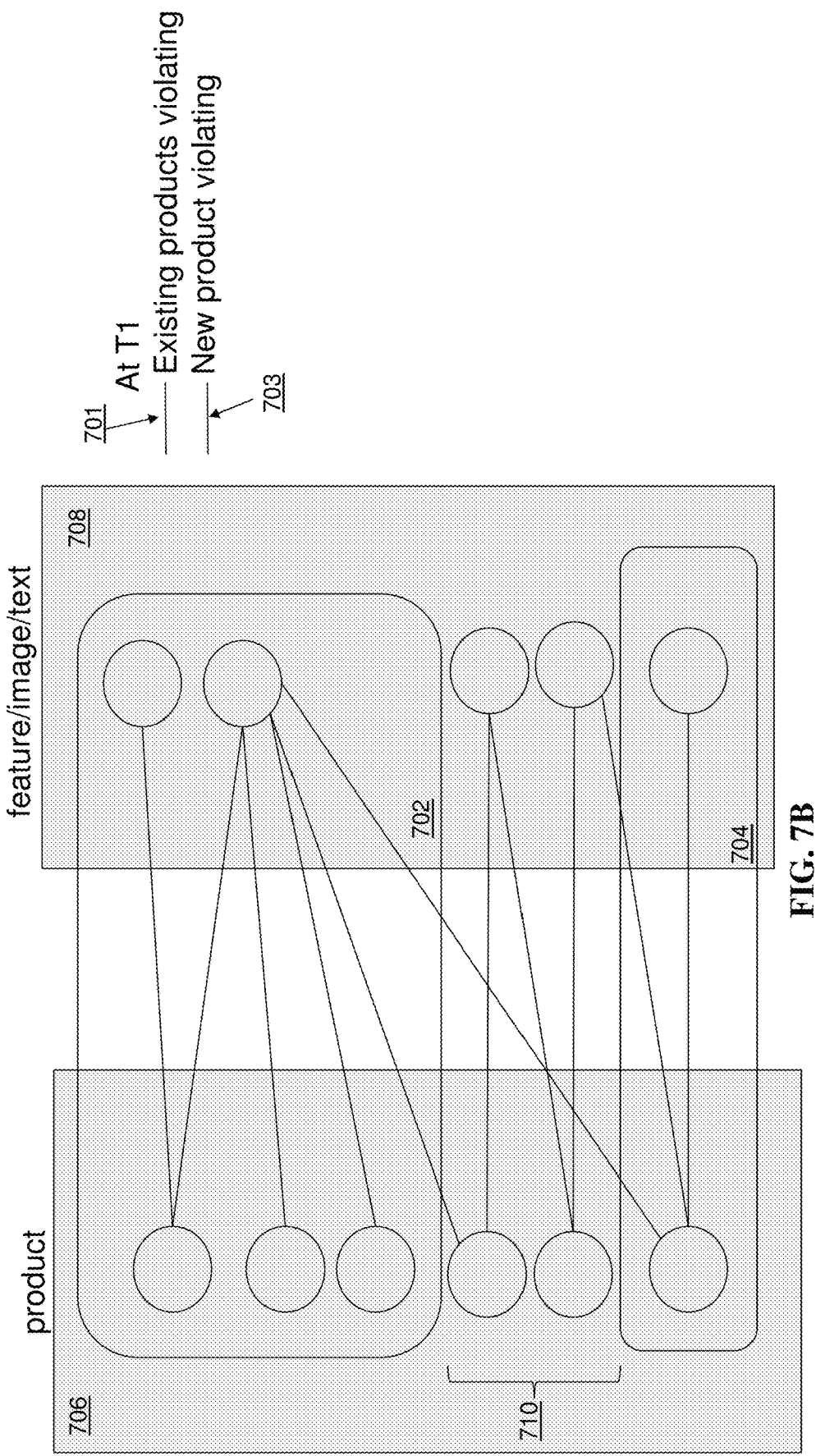

In the example of FIG. 7A, at time T0, a bipartite graph is generated by the engine 300 having a first partition 706, and a second partition 708 and applied to data components in an initial training set 702 and an initial testing set 704. In the example illustrated, the first partition 706 contains data components identifying products and the second partition 708 contains data components identifying features/images/text for the products. Referring to FIG. 7B, at time T1, the connectivity graph is updated based on additional data components and relationships observed by the engine 300 (e.g. via the connectivity determination module 412). In this example, one or more new data components 710 are observed and added to the bipartite graph along with edges joining vertices where a relationship exists therebetween. As illustrated, there is also now an edge connecting existing data components from the initial training set 702 to the initial testing set 704, shown as a first violating edge(s) 701. Additionally, because of the new data components 710 added to the bipartite graph, there are also edges and corresponding vertices shown as new violating edges 703 that are connecting the initial training set 702 and the initial testing set 704.

Figure 7C:
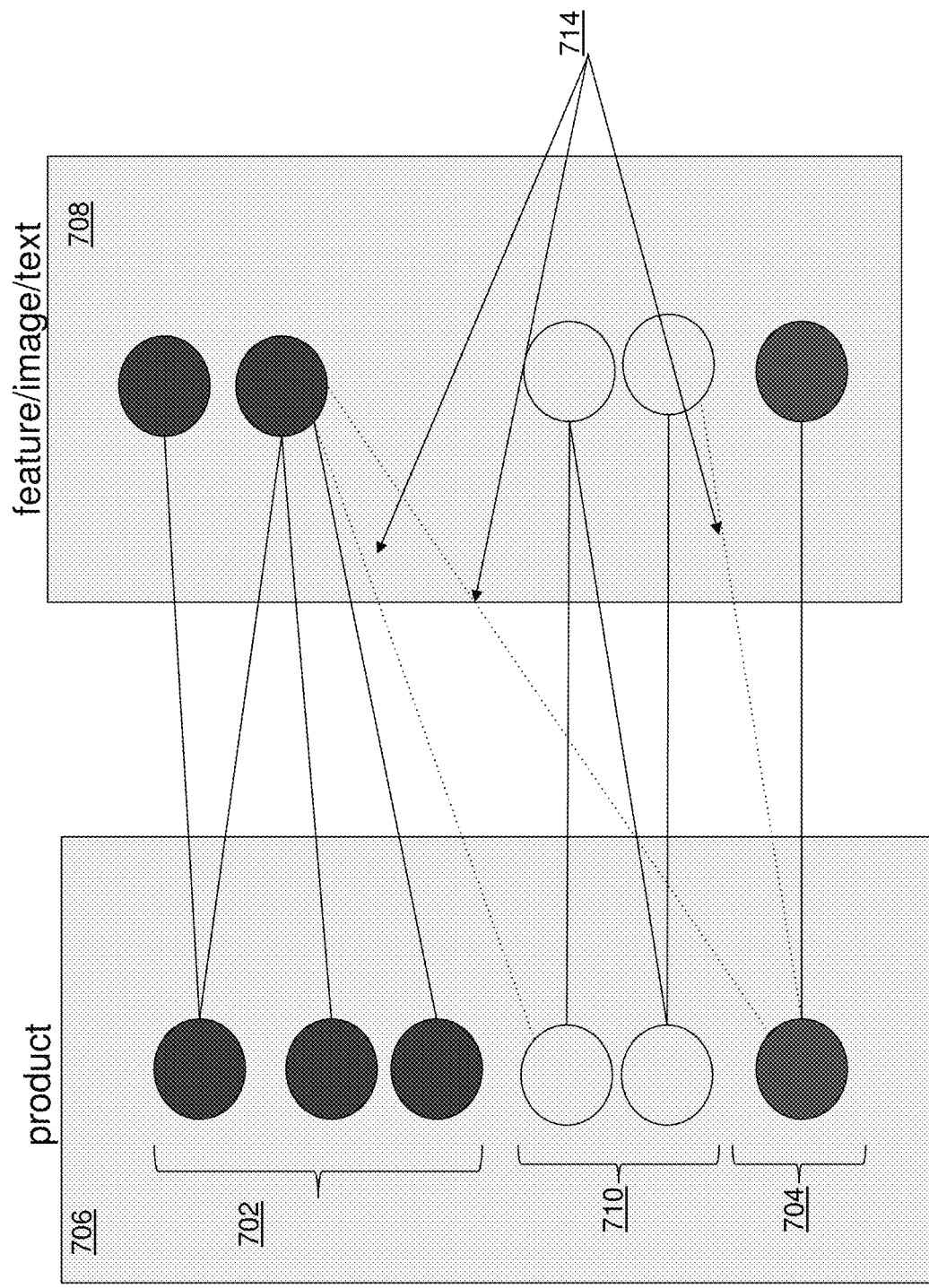
Figure 7D:
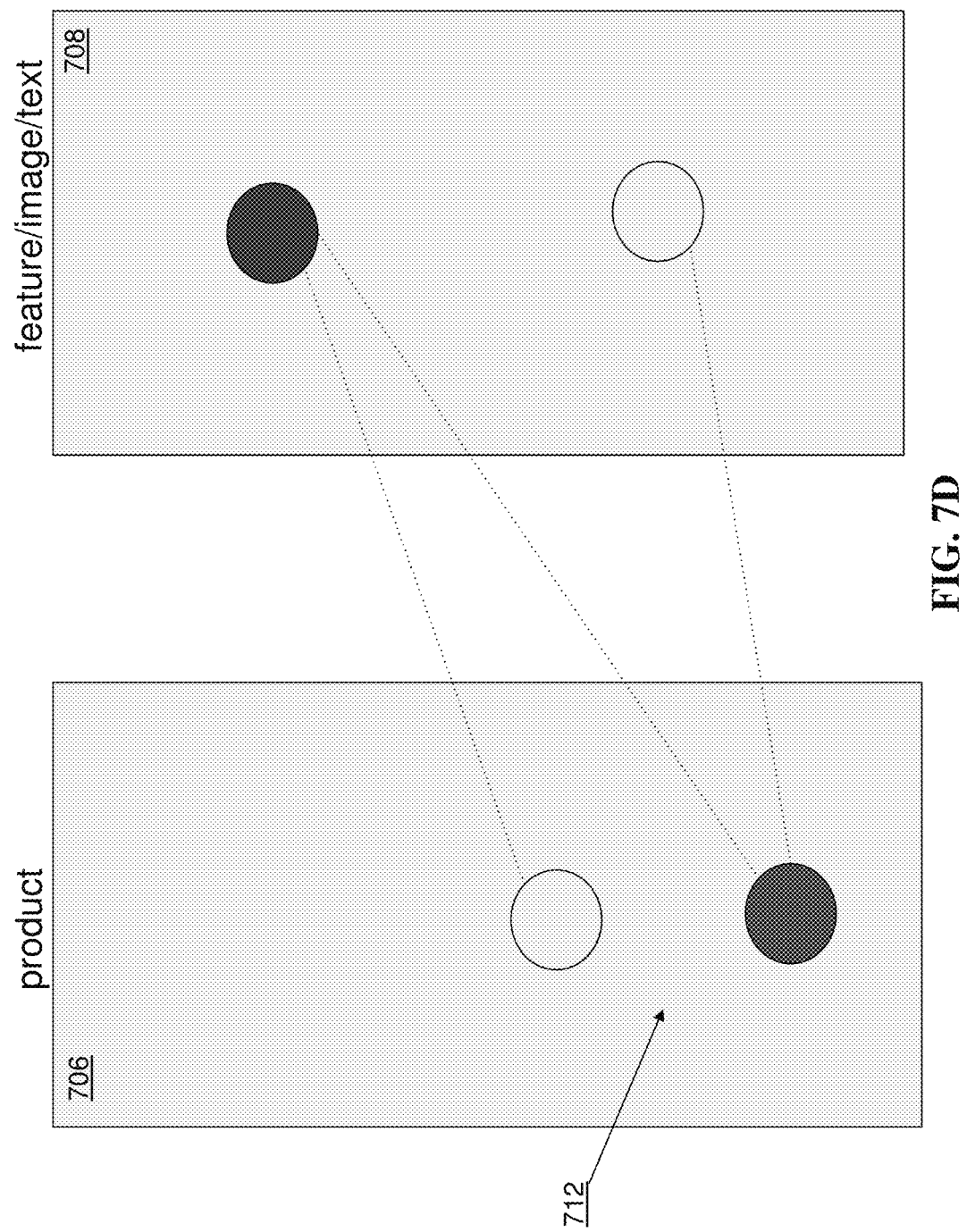

As mentioned earlier, one objective of the engine 300 is to ensure that there is no data leakage between the training and testing sets when defining new model data observed for retraining the model. In the example of FIG. 7B, the engine 300 executes a connected components algorithm on the new graph including existing model data components and newly observed data components and determines new components connecting the prior training and testing data sets, which are problematic. Within each problematic component or vertex determined (e.g. which may result in a potential data leakage concern) via the connectivity determination module 412, the corresponding edges in the graph are identified by the engine 300 as illustrated in FIG. 7C. In FIG. 7C, the problematic edges 714 that connect vertices belonging to different conflicting data sets (e.g. training and testing) are identified and illustrated. Subsequent to this identification of problematic new components and corresponding vertices/edges, as shown in FIG. 7D, the engine 300 may be configured to find a maximum independent set within each problematic subgraph 712 and thus remove the complement so that as many vertices as possible are kept on the condition that no two vertices in the problematic subgraph 712 remain connected.

Thus, once the revised training and testing datasets have been defined by the methods described herein by the engine 300, having one or more data components selected from the new data set, they are then applied by the model generation module 410 to generate the retrained model 406. Preferably, the data assignment module 408 assigns new data components having vertices with a determined connectivity or relationship to other data components in a particular data set (e.g. the training data set) to that data set.

In at least one aspect, a second criteria in the model criteria 415 implemented by the engine 300 may include ensuring that the data partitions between testing and training data sets remain persistent between the prior iteration of the model and the currently proposed model. For instance, this may imply that the data components in the prior training set 407 and the data components in the prior testing set 409 remain in respective partitions when generating the new model parameters including the new training set 411 and the new testing set 413.

In one aspect, this may be implemented by the data assignment module 408 which may assign an identifier to each data component in the prior training set 407, prior testing set 409 to ensure that when generating the testing/training partitions for the new model, the data component remain in their previously assigned partitions in the new training set 411 and the new testing set 413. As described earlier, once assigned, these updated model data sets are applied by the model generation module 410 to generate the retrained model 406.

In at least some embodiments, both the new training set 411 and the new testing set 413 may be assigned one or more components of the new data set from the new data repository 402 while satisfying the above-mentioned criteria of no leakage of data between the partitions. In such an embodiment, the new test set 413 may be applied, via the engine 300, to both the retrained model 406 and the prior trained model 404 to determine which iteration of the machine-learning model has a better accuracy score for deployment in classification. Thus, the engine 300 may utilize the iteration of the model having the better performance accuracy. In other aspects, additional criteria may be applied to determine which iteration of the model to use. For instance, in some aspects, such additional criteria may include prioritizing a newer iteration of the model or a model having a larger sized training/testing set or better feature distribution reflecting new data as compared to its prior iteration, even if the performance is otherwise equal.

Example Operations of the Engine 300

Consider for instance, a machine learning model previously trained to classify received images of a particular item as a "top" or a "blouse". However, over time, e-commerce merchants or other input sources may add on images of additional fashion products with "geometric sleeves". If the prior machine learning model was trained some time ago and did not include images for "geometric sleeves" in the training set, it is thus unable to recognize them or may mistakenly recognize them as another item altogether. Additionally, if the prior model data did not include images with "geometric sleeves" in the prior testing set, then when evaluated, the prior model may incorrectly reveal a high accuracy score. If an approach is applied to incorporate the new data whereby the new data is randomly applied to the training set/test set, train an updated model and evaluate it, then the earlier model may have a very good score but the later model may have a lower score if such "geometric sleeves" are generally difficult to detect. In this hypothetical case, the method would erroneously determine that the earlier machine-learning model is better because it was never evaluated on a test set with the "geometric sleeves". Conveniently, the proposed engine 300 including the proposed methods and systems discussed herein address this inconsistency and overcome the deficiencies noted. That is, in at least some embodiments of the present disclosure, one of the criteria for the engine 300 is to have persistent training and testing data set partitions which may enable one or more of the following steps:

a. add newly observed products (e.g. geometric sleeves) to existing training and testing data set while preserving the criteria that no training samples should also be present in the test set;

b. evaluate the earlier model and the later proposed model on the currently proposed test set (which includes samples of geometric sleeves) because the proposed test set for a retrained model has no samples from the earlier model's training set;

c. annotate the training samples proposed for the later model to include "geometric sleeves" and train a new model based on the proposed training samples; and d. evaluate the currently proposed model (e.g. the retrained model) and the prior model both on the updated test set proposed for the retrained model and select the model for deployment which has the higher performance based on the evaluation in the new testing state.

Broadly, one implementation of the engine 300 executes an optimization system and method, which includes executing a connected components algorithm on the new product data components, as provided in the new data repository 402. Put another way, in such implementation, the engine 300 is configured to delete or remove as small number of elements of the new product data components as possible while respecting the training/testing data split and avoiding leakage. By executing the connected components algorithm (e.g. via the connectivity determination module 412), the engine 300 determines how much of the new data components can be added to the new training/testing data sets without breaking constraints of data leakage.

Figure 5A:
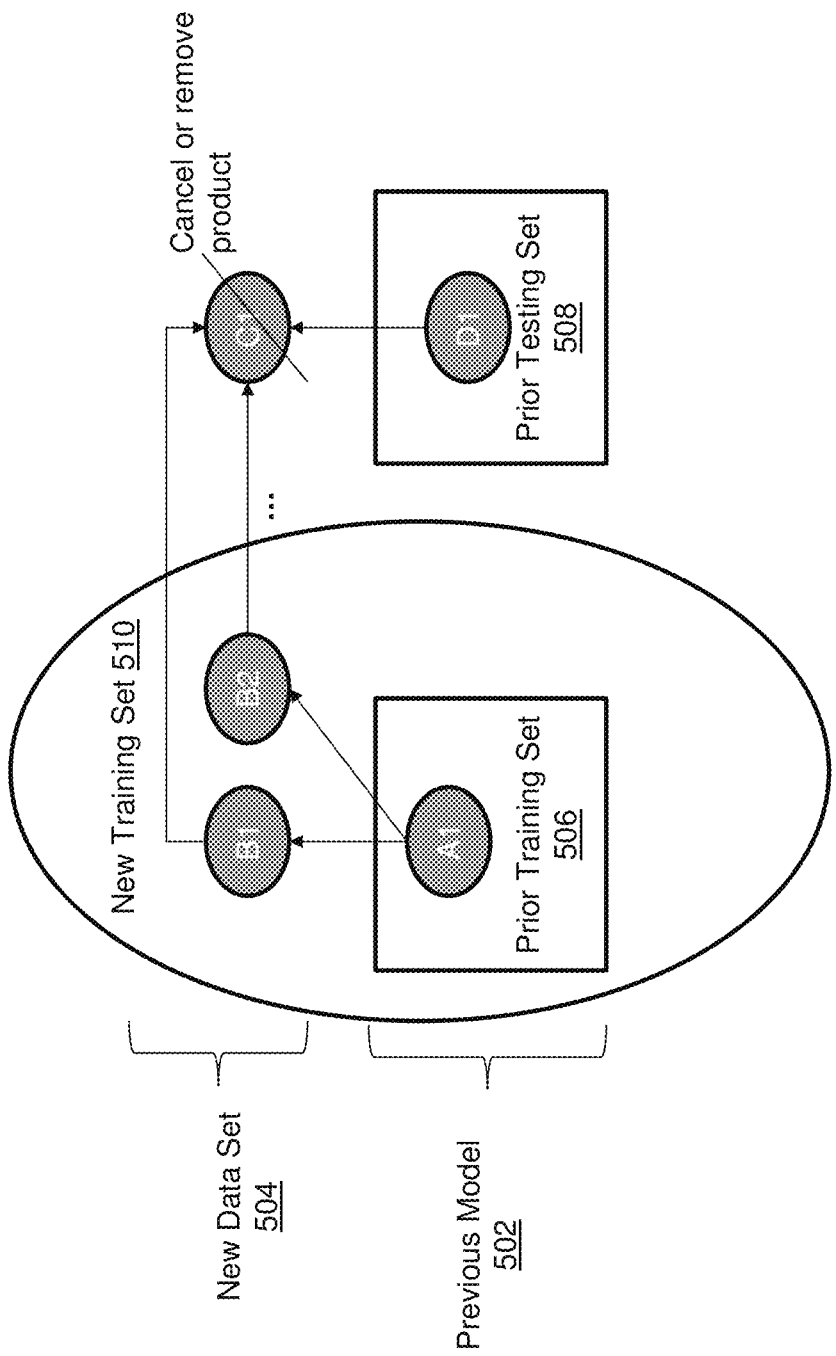
FIGS. 5A-5D are schematic diagrams illustrating an example process executed by the engine of FIGS. 3 and 4 for determining optimal inclusion of new data to include in model data sets for retraining the machine learning model, according to one embodiment.

FIG. 5A illustrates an example operation of the engine 300 of FIGS. 3 and 4 for intelligently assigning selected new data components to one of a testing and a training data set for retraining a previously trained classification model.

The example of FIG. 5A illustrates the process of running a connected components algorithm (e.g. by the connectivity determination module 412) to generate the maximum independent set by excluding a data point (product ID C).

In the example of FIG. 5A, letters A-D represent data components with product identification metadata, also known as product IDs. Each product ID (e.g. shown as product ID data set 405 in FIG. 4) may have an associated text hash and an associated image hash (e.g. from text data set 403 and image data set 401). Product A is present in the training set used to train the first iteration of the model, shown as the prior training set 506 (e.g. an example embodiment of the prior training set 407 of FIG. 4). Product A shares an association with product B1 and B2 (part of the new dataset 504, an embodiment of the new data set repository 402) in that it may share the same text hash or image hash. In turn, as shown by the connectivity graph in FIG. 5A, products B1 and B2 share an association with product C1 (shown via an edge connecting the vertices relating to the data components). Product C1 also shares an association with Product D1, which is part of the test set of the first iteration of the model, shown as the prior testing set 508. In this example, including all of the new data components in the new data set 504 in the training set would result in overfitting, as product A would be associated with D through the chain of new products, thereby linking the testing and training partitions. This would break the data leakage criterion discussed earlier for the engine 300. Therefore, the association chain in the connectivity graph of FIG. 5A is broken by excluding data components for product C, e.g. element C1, from the new data 504 that is used to train the model. In turn, the data components B1 and B2 from the new data set 504 are then included in the set of data used to retrain the second iteration of the model, e.g. the new training set 510. In this aspect and referring to FIGS. 3-5A, the engine 300 may run a connected components algorithm to determine the maximum independent set prior to including one or more new product data components from new data in the model data in the continuous training of a machine learning model (e.g. retraining the model to form the retrained model 406 as shown in FIG. 4).

Referring to FIGS. 5A-5D, there is shown example process for the engine 300 shown in FIGS. 3 and 4 for assigning and allocating new data (e.g. data components from new data repository 402) for building and/or testing a retrained machine learning model (e.g. the retrained model 406). In the example implementation, the engine 300 may implement another process for determining the new training and testing data sets from the new data components while ensuring that there's no data leakage.

In this aspect, the engine 300 may initially merge the new product data components into existing model data components split into the training and testing data sets for a previously trained model and determine, via the connectivity determination module 412, whether connectivity (e.g. content similarity between component nodes or vertices) between one or more new product data components and existing data components exists. Subsequently, the data assignment module 408 determines whether a particular new product node or vertex (e.g. a bipartite graph formed via the connectivity data graph 414) is connected to an existing product node in both the training and testing data sets. If so, then such new product nodes or vertices are discarded altogether and excluded from inclusion in the training and testing data sets (e.g. the new training set 411 and the new testing set 413) used for retraining the model.

Put another way, the engine 300 may execute a one hop traversal algorithm implemented by the connectivity determination module 412 to traverse all nodes or vertices in the connectivity data graph 414 (e.g. examples of such data graphs shown in FIGS. 5A-5D) such that data components corresponding to all new product nodes are traversed and it is determined whether each node or vertex corresponding to a data component is connected either directly or indirectly to two different labelled partitions (e.g. train and test set). If that is the case, the new node is considered a conflict node and is deleted from consideration such that the new product node is not added to either the test or the training data set.

Figure 5B:
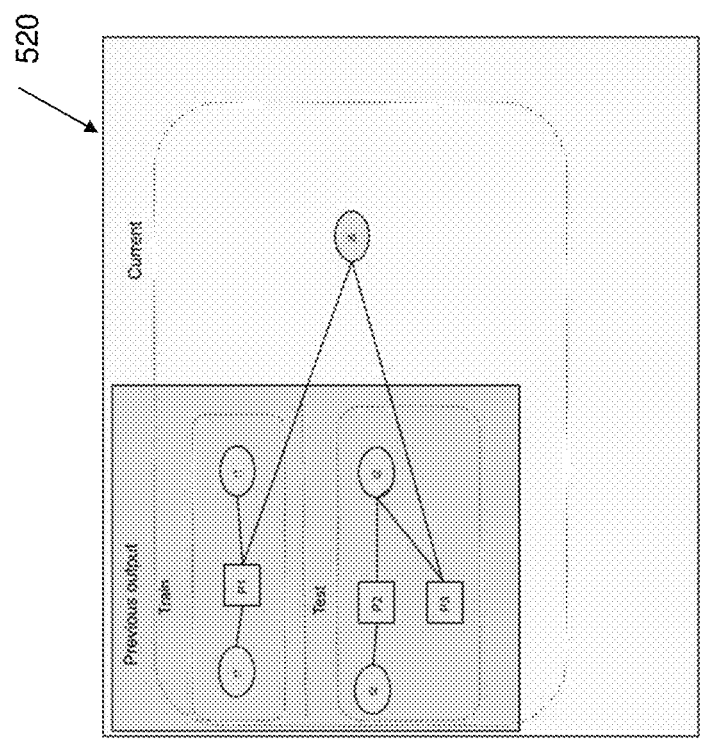

Referring to the example in FIG. 5B, shown is an example of a connectivity data graph 414 shown as a first graph 520 having vertices corresponding to product attributes including product identification, image, and text as generated by the engine 300. As described herein, edges connect two vertices whereby the vertices have underlying data components that share or overlap data attributes (e.g. same image, same text or same product identification).

In the example of FIG. 5B, the data attributes for the previously trained and tested model components (e.g. prior training set 407 and prior testing set 409) are shown on the left hand side of the first graph 520 and a new image component, i5 is received or otherwise detected which is determined by the engine 300 as being connected to or otherwise associated with the two products P1 and P3 respectively belonging to the existing training and testing data sets. In this case, the engine 300 may visualize such a relationship connection by an edge being drawn therebetween. Once the first graph 520 is formed and the connections between the vertices determined, the engine 300 then proceeds to remove new data component i5 from consideration such that it is not added to either the existing training or testing sets as it would otherwise cause a data leakage issue.

Figure 5C:
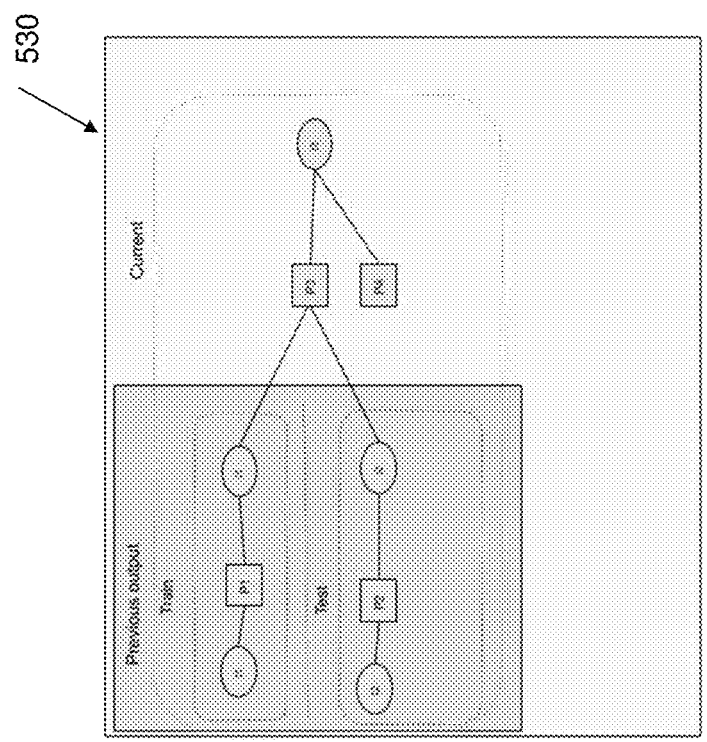

In another example connectivity graph shown in FIG. 5C, a second graph 530 is generated containing vertices for each of the data components from the prior training set, the prior testing set as well as new data components observed by the engine 300. Such a graph may be generated via the connectivity determination module 412 shown in FIG. 4. The vertices are joined by edges where there is overlap in content between the data attributes contained therein. When implementing the maximal independent set approach to determine the largest possible set of components without data leakage, the engine 300 may remove product P3 or image i3 and keep product node P4 such that it may be assigned to the training data set to be applied for generating a new model, such as the retrained model 406. In an alternative approach of determining connected components by the connectivity determination module 412, the engine 300 may remove vertices shown for product P3, product P4 and image i3 as they are all connected to both the prior training and testing data sets in the previous output model. This approach may eliminate more data components but achieve a faster processing time with reduced complexity.

In another example of a connected graph generated by the engine 300, a third graph 540 is provided illustrating data connectivity between one or more data components from a prior training set, testing set and a currently observed data set. As described earlier, the third graph 540 may be generated by the connectivity determination module 412 to determine which components of the new data to assign to which of the prior testing and training data sets to retrain the model in a subsequent iteration of the engine 300.

Figure 5D:
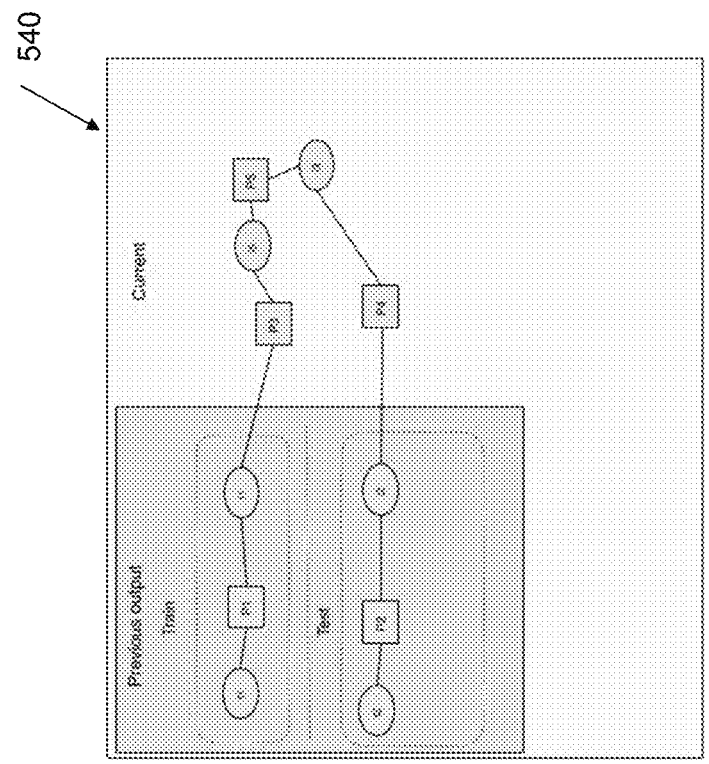

In one implementation, upon generating the third graph 540 in FIG. 5D, the engine 300 may break the chain of edges connecting the vertices between the new data components and the prior testing/training data sets such as by removing the vertices for data components P3, P4 or P5 (and assigning the remaining nodes to the training set to form an updated training set for retraining the model). In a second approach, the engine 300 may be configured to alternatively remove the whole chain of vertices P3, P4, P5 and connected images i3 and i5 for causing a conflict as these vertices corresponding to data components are connected to both training and testing data sets (either directly or indirectly via another data component).

Figure 6:
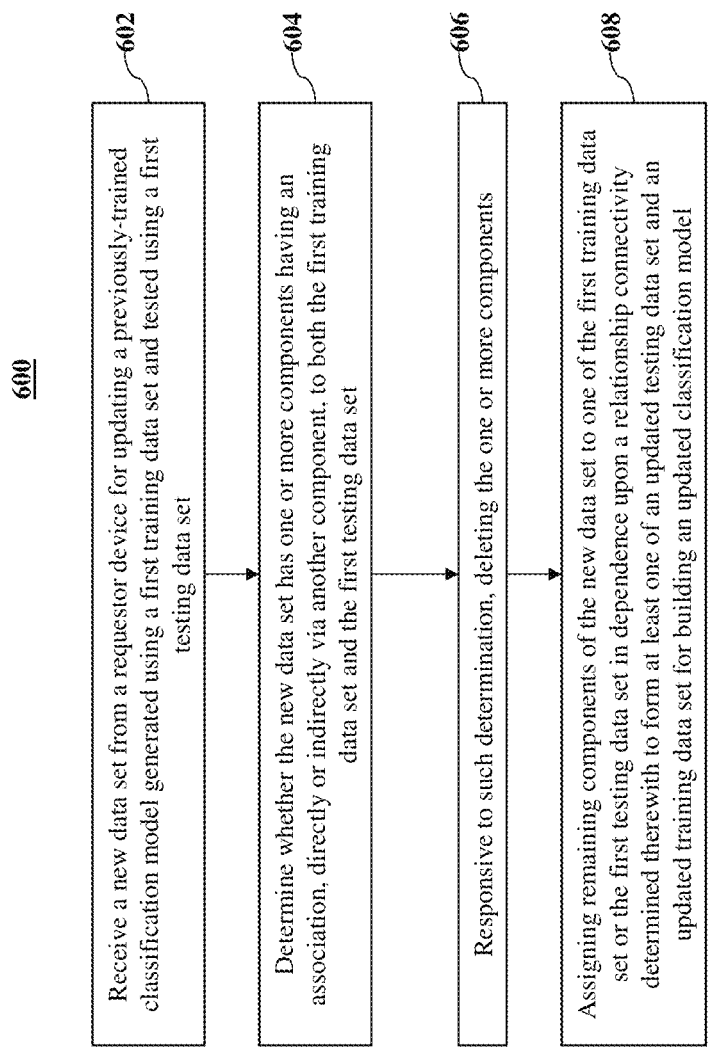
FIG. 6 is a flowchart of a computerized method, which may be implemented by the engine of FIGS. 3 and 4, for dynamically constructing an updated training data set for retraining a previously trained classification model to account for data drift, according to one embodiment.

FIG. 6 illustrates an example flowchart of operations 600 which may be performed by the engine 300 for intelligently and dynamically retraining a previously trained machine learning model by constructing new training and testing data sets based on new data components detected on a computing device, such as the e-commerce platform 100 or on another computing device such as the merchant devices 102 or customer device 150. The operations 600 are further described below with reference to FIGS. 1-4, 5A-5D and 7A-7D.

In at least some aspects, the operations 600 or at least a portion of the operations 600 may be performed by two or more computers cooperating together with the engine 300 across the communications network (additional computing elements not shown for simplicity of illustration). The two or more computers may include the e-commerce platform 100, the merchant devices 102, the customer device 150 and/or additional computers to perform the operations 600.

The computing device for carrying out the operations 600 may comprise a processor configured to communicate with a display to provide a graphical user interface (GUI) where the computing device has a network interface to receive various features of product information (e.g. text, images, and other product information as may be stored in new data repository 402, prior trained model 404, retrained model 406 and connectivity data graph 414), and model criteria preferences (e.g. stored in model criteria 415) and wherein instructions (stored in a non-transient storage device), when executed by the processor, configure the computing device to perform operations such as operations 600.

In at least some aspects of the operation 600, the supervised learning model being generated via the model generation module 410 or previously generated on a prior iteration is a classification model including a neural network for classifying the e-commerce products containing at least image content (and in some aspects, text) into a set of labelled categories of products by training the classification model based on the training dataset and testing a performance of the classification model using the testing dataset.

In operation 602, the processor receives a new input dataset relating to e-commerce products, each sample in the dataset containing a set of feature attributes and associated values for each product, the attributes containing an image or text for each product.

Notably, each of the components in the new data set may be assessed for optimal inclusion in retraining and rebuilding the supervised machine learning model, and includes features or attributes relating to one or more e-commerce products. The features/attributes may be in the form of images and/or text characterizing each e-commerce product. The attributes may include but are not limited to: product description, product identification, brand identification, financial statistics related to the products, product images, brand images, and customer images, etc.

In the operation at 602, the processor may receive the new data set including data components defining image data, product ID or text data from a requestor device for classification thereof. The processor for the engine 300 may utilize one or more components of the new data set (e.g. data samples stored in the new data repository including image data set 401, text data set 403 and product ID data set 405) for optimally retraining the previously trained machine learning classification model. As noted earlier, the previously trained model may have been previously generated using a first training data set (e.g. prior training set 407) and tested using a first testing data set (e.g. a prior testing set 409).

Following operation 602, in operation 604, the processor determines whether the new data set includes or has one or more components having an association, directly or indirectly via another component, to respective components in both the first training data set (e.g. the prior training set 407) and the first testing data set (e.g. the prior data set 417). As noted earlier, the processor may perform such a step by generating the connectivity data graph 414, examples of which are shown in FIGS. 5A-5D and in FIGS. 7A-7D.

Following operation 604, in operation 606, responsive to such a determination, the processor is configured to delete the one or more components which are connected to both the prior testing and training data sets. Such a process was illustrated in FIG. 5A, whereby a new data component C1 part of the new data set 504 was deleted in response to having a connection, either directly or indirectly via other components to the prior training set 506 or the prior testing set 508 (used to build a previous model 502).

Following operation 606, in operation 608, the processor is further configured to assign remaining data components of the new data set (e.g. those components which do not cause a data leakage by being connected to both the testing and training data sets) to one of the first training data set or the first testing data set, such as to respectively formulate the new training set 411 and/or the new testing set 413. The assignment of which partition each of the data components belong to is determined by the processor of the engine 300 in dependence upon determining a relationship connectivity exists (e.g. one or more edges connecting two vertices corresponding to data components) to form at least one of an updated testing data set and an updated training data set for building an updated classification model (e.g. the retrained model 406). Referring to the example of FIG. 5A, the processor of the engine 300 assigned each of the remaining new data components B1 and B2 to the training set as there existed an edge between each of the vertices B1 and B2 and the prior training set 506 such as to formulate the new training set 510.

Optionally, in operation 608, the processor of the engine 300 may further be configured to apply the updated testing data set having at least some components of the new data set for evaluating both the updated classification model (e.g. the retrained model 406) and the previously-trained classification model (e.g. the prior trained model 404) to determine a performance comparison therebetween and only deploy the model which provides the improved performance. That is, if the retrained model performs poorly in comparison to the original iteration of the model, then the engine 300 may continue to apply the original model for subsequent classification of products.

Optionally, the processor of the engine 300 may utilize a connectivity data graph 414, such as a bipartite graph to determine relationships between data components in the new data and the prior training/testing data sets in order to determine the associations in operation 604. Examples of such bipartite graphs are shown in FIGS. 7A-7D.

In this aspect, the processor of the engine 300 may generate, via the connectivity determination module 412, a bipartite graph having a plurality of vertices corresponding to components of the first training data set and the first testing data set (e.g., the prior training set 407 and the prior testing set 409). In this case, the bipartite graph may include a first portion having at least one vertex corresponding to product image data, and a second portion having at least one vertex corresponding to product textual data, and graph edges connecting vertices of the first portion to vertices of the second portion to indicate sharing of data between the data components (e.g. see FIGS. 7A-7D). Once the new data is received, the processor of the engine 300 may add vertices corresponding to components of the new data set to the bipartite graph. Subsequently, the engine 300 may determine that a particular component vertex of the added vertices of the bipartite graph is connected by one or more graph edges to both a vertex of the first testing data set and to a vertex of the first training data set. In this case, removing the components from consideration in operation 606 includes removing the particular component vertices and corresponding edges from the bipartite graph.

In another aspect, once the engine 300 generates the bipartite graph and adds vertices corresponding to components of the new data set (e.g. new data set 504 or new data repository 402), the engine 300 then utilizes the bipartite graph (e.g. an example of the connectivity data graph 414) to determine which components of the new data set to use to construct a new testing/training data set. Thus, the engine 300 applies a maximum independent set algorithm to the bipartite graph to determine a largest independent data set to form one of the updated training data set and the updated testing data set (e.g., the new training set 411 and the new testing set 413). In this case, removing the data components from consideration in operation 606 includes removing vertices from the bipartite graph not associated with the determined largest independent data set.

Optionally in this case and in one example of operation 606, deleting the one or more components involves deleting vertices connected by one or more graph edges to vertices not associated with the determined largest independent data set (e.g. see FIG. 7D).

In one or more examples, the functions described may be implemented in hardware, software, firmware, or combinations thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including such media that may facilitate transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. In addition, the techniques could be fully implemented in one or more circuits or logic elements. The techniques of this disclosure may be implemented in a wide variety of devices or apparatuses, an integrated circuit (IC) or a set of ICs (e.g., a chip set).

Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

Various embodiments have been described. These and other embodiments are within the scope of the following claims.

The invention claimed is:

1. A computer-implemented method comprising:
    receiving a new data set from a requestor device for updating a previously-trained machine learning model generated using supervised learning with a first training data set and tested using a first testing data set;
    generating a bipartite graph having a plurality of vertices corresponding to respective components of the first training data set and the first testing data set;

adding vertices corresponding to components of the new data set to the bipartite graph;

determining based on the bipartite graph that the new data set has one or more components having an association, directly or indirectly via another component, to both the first training data set and the first testing data set;

responsive to determining that the new data set has one or more components having an association to both the first training data set and the first testing data set, deleting the one or more components; and assigning remaining components of the new data set to one of the first training data set or the first testing data set in dependence upon a relationship connectivity determined therewith to form at least one of an updated testing data set and an updated training data set for building an updated machine learning model.

2. The method of claim 1, wherein the machine learning model is a classification model.

3. The method of claim 1, further comprising: applying the updated testing data set having at least some components of the new data set for evaluating both the updated machine learning model and the previously-trained machine learning model to determine a performance comparison therebetween.

4. The method of claim 3, wherein the previously-trained machine learning model and the updated machine learning model are classification models, and wherein subsequent to applying the updated testing data set to determine the performance comparison, deploying one of: the previously-trained machine learning model and the updated machine learning model corresponding to an improved performance for classification of subsequent data sets.

5. The method of claim 1, wherein components previously partitioned in the first training data set and the first testing data set remain in persistent original partitions for performing testing or training when the at least one of the updated testing data set and the updated training data set is formed.

6. The method of claim 5, wherein each component of the new data set, the first training data set, the first testing data set, and the at least one of the updated training data set and the updated testing data set comprises data corresponding to one of: a product identification, a product image and a product textual data.

7. The method of claim 6, further comprising:
determining that a particular component vertex of the added vertices of the bipartite graph is connected by one or more graph edges to both a vertex of the first testing data set and to a vertex of the first training data set, wherein deleting the one or more components comprises: removing the particular component vertex from the bipartite graph, wherein the bipartite graph comprises a first portion having at least one vertex corresponding to product image data, a second portion having at least one vertex corresponding to product textual data, and graph edges connecting vertices of the first portion to vertices of the second portion to indicate sharing data therebetween.

8. The method of claim 1, further comprising:
applying a maximum independent set algorithm to the bipartite graph, the bipartite graph further comprising the added vertices corresponding to components of the new data set, for determining a largest independent data set to form the at least one of the updated training data set and the updated testing data set, wherein deleting the one or more components comprises: removing vertices from the bipartite graph not associated with the determined largest independent data set, wherein the bipartite graph comprises a first portion having at least one vertex corresponding to a product image, a second portion having at least one vertex corresponding to a product textual data, and graph edges connecting vertices of the first portion to the second portion.

9. The method of claim 8, wherein deleting the one or more components further comprises: deleting vertices connected by one or more graph edges to vertices not associated with the determined largest independent data set.

10. The method of claim 1, further comprising:
receiving a trigger from the requestor device providing an indication of updating the previously-trained machine learning model, the trigger comprising one or more of: a defined time interval from generating the previously-trained machine learning model; and an indication from the requestor device that the previously-trained machine learning model is degrading in performance; and, in response to the trigger, querying the requestor device for the new data set for retraining the previously-trained machine learning model.

11. The method of claim 10, wherein the machine learning model is a classification model and the indication that the previously-trained machine learning model is degrading in performance comprises degrading in performance for classifying incoming data sets.

12. The method of claim 2, further comprising:
receiving a trigger from the requestor device providing an indication of updating the previously-trained machine learning model, the trigger comprising: a notification that incoming datasets for classification by the classification model have different classifications than the first training data set; and, in response to the trigger, querying the requestor device for the new data set for retraining the previously-trained machine learning model.

13. The method of claim 1, further comprising: transmitting the updated machine learning model to the requestor device, across a communications network for automatically applying to subsequent data sets.

14. A computer system comprising:
a processor; and
a storage storing instructions that, when executed by the processor, cause the system to:
receive a new data set from a requestor device for updating a previously-trained machine learning model generated using supervised learning with a first training data set and tested using a first testing data set;
generate a bipartite graph having a plurality of vertices corresponding to respective components of the first training data set and the first testing data set;
add vertices corresponding to components of the new data set to the bipartite graph;
determine based on the bipartite graph that the new data set has one or more components having an association, directly or indirectly via another component, to both the first training data set and the first testing data set;
responsive to determining that the new data set has one or more components having an association to both the first training data set and the first testing data set, delete the one or more components; and assign remaining components of the new data set to one of the first training data set or the first testing data set in dependence upon a relationship connectivity determined therewith to form at least one of an updated testing data set and an updated training data set for building an updated machine learning model.

15. The system of claim 14, wherein the machine learning model is a classification model.

16. The system of claim 14, wherein the instructions, when executed by the processor, further cause the system to:
apply the updated testing data set having at least some components of the new data set to evaluate both the updated machine learning model and the previously-trained machine learning model to determine a performance comparison therebetween.

17. The system of claim 16, wherein the previously-trained machine learning model and the updated machine learning model are classification models, and wherein the instructions, when executed by the processor, further cause the system to:
subsequent to applying the updated testing data set to determine the performance comparison, deploy one of: the previously-trained machine learning model and the updated machine learning model corresponding to an improved performance for classification of subsequent data sets.

18. The system of claim 14, wherein components previously partitioned in the first training data set and the first testing data set remain in persistent original partitions for performing testing or training when the at least one of the updated testing data set and the updated training data set is formed.

19. The system of claim 18, wherein each component of the new data set, the first training data set, the first testing data set, and the at least one of updated training data set and the updated testing data set comprises data corresponding to one of: a product identification, a product image and a product textual data.

20. The system of claim 19, wherein the instructions, when executed by the processor, further cause the system to:
determine that a particular component vertex of the added vertices of the bipartite graph is connected by one or more graph edges to both a vertex of the first testing data set and to a vertex of the first training data set,
wherein deleting the one or more components comprises: removing the particular component vertex from the bipartite graph,
wherein the bipartite graph comprises a first portion having at least one vertex corresponding to product image data, a second portion having at least one vertex corresponding to product textual data, and graph edges connecting vertices of the first portion to vertices of the second portion to indicate sharing data therebetween.

21. The system of claim 14, wherein the instructions, when executed by the processor, further cause the system to:
apply a maximum independent set algorithm to the bipartite graph, the bipartite graph further comprising the added vertices corresponding to components of the new data set, for determining a largest independent data set to form the at least one of the updated training data set and the updated testing data set,
wherein deleting the one or more components comprises: removing vertices from the bipartite graph not associated with the determined largest independent data set,
wherein the bipartite graph comprises a first portion having at least one vertex corresponding to a product image, a second portion having at least one vertex corresponding to a product textual data, and graph edges connecting vertices of the first portion to the second portion.

22. The system of claim 21, wherein deleting the one or more components further comprises the processor being configured to delete vertices connected by one or more graph edges to vertices not associated with the determined largest independent data set.

23. The system of claim 14, wherein the instructions, when executed by the processor, further cause the system to:
receive a trigger from the requestor device providing an indication of updating the previously-trained machine learning model, the trigger comprising one or more of: a defined time interval from generating the previously-trained machine learning model; an indication from the requestor device that the previously-trained machine learning model being a classification model is degrading in performance for classifying incoming data sets; or a notification that incoming datasets for classification by the machine learning model being a classification model have different classifications than the first training data set; and,
in response to the trigger, query the requestor device for the new data set for retraining the previously-trained machine learning model.

24. The system of claim 12, wherein the instructions, when executed by the processor, further cause the system to: transmit the updated machine learning model to the requestor device, across a communications network for automatically applying to subsequent data sets.

25. A non-transitory computer readable medium having instructions tangibly stored thereon, wherein the instructions, when executed by one or more processors cause the one or more processors to:
receive a new data set from a requestor device for updating a previously-trained machine learning model generated using supervised learning with a first training data set and tested using a first testing data set;
generate a bipartite graph having a plurality of vertices corresponding to respective components of the first training data set and the first testing data set;
add vertices corresponding to components of the new data set to the bipartite graph;
determine based on the bipartite graph that the new data set has one or more components having an association, directly or indirectly via another component, to both the first training data set and the first testing data set;
responsive to determining that the new data set has one or more components having an association to both the first training data set and the first testing data set, delete the one or more components; and
assign remaining components of the new data set to one of the first training data set or the first testing data set in dependence upon a relationship connectivity determined therewith to form at least one of an updated testing data set and an updated training data set for building an updated machine learning model.

* * * * *